Aug. 16, 1927.

M. F. FITZGERALD

ELECTRIC TOASTING DEVICE

Filed Feb. 12, 1925

Inventor:
Maurice F. Fitzgerald,
By Sturtevant & Mason
Att'ys.

Aug. 16, 1927.
M. F. FITZGERALD
1,639,403
ELECTRIC TOASTING DEVICE
Filed Feb. 12, 1925
2 Sheets-Sheet 2
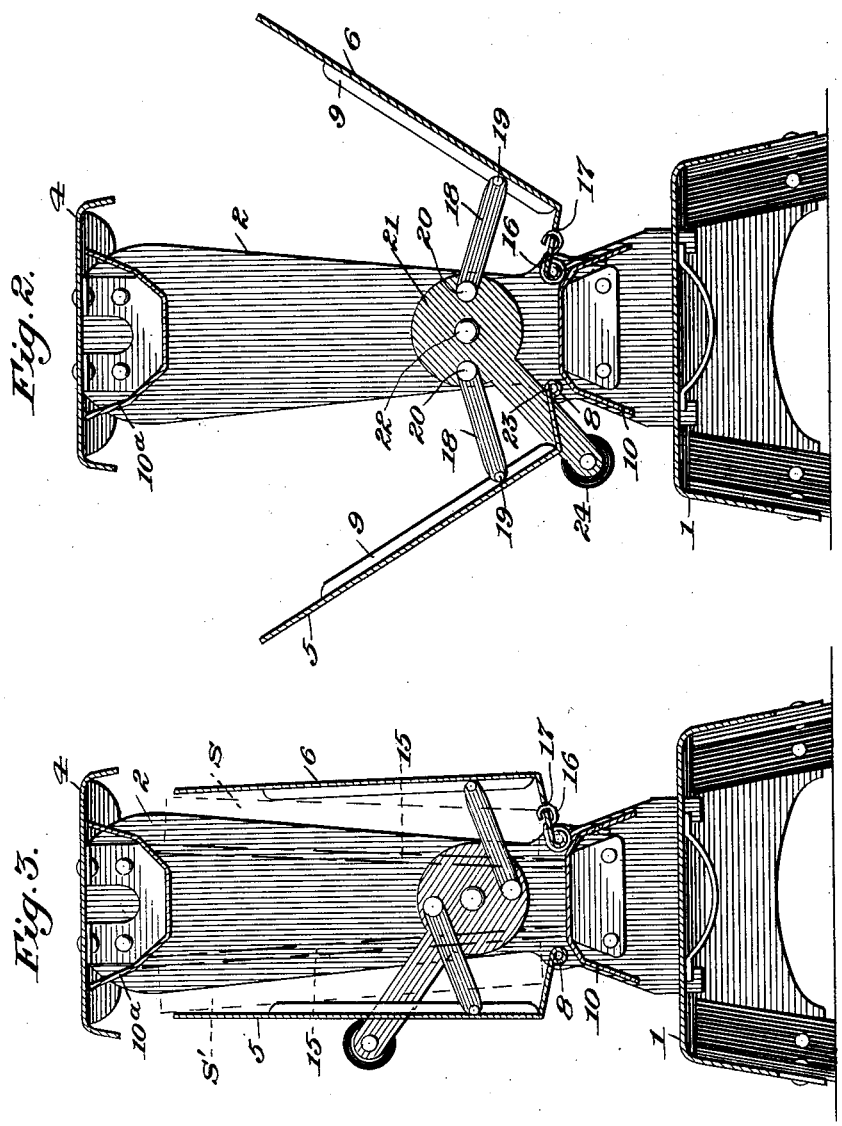
Inventor:
Maurice F. Fitzgerald,
By Sturtevant & Mason.
Att'ys.

Patented Aug. 16, 1927.

1,639,403

UNITED STATES PATENT OFFICE.

MAURICE F. FITZGERALD, OF WINSTED, CONNECTICUT, ASSIGNOR TO THE FITZGERALD MFG. CO., OF TORRINGTON, CONNECTICUT, A CORPORATION OF CONNECTICUT.

ELECTRIC TOASTING DEVICE.

Application filed February 12, 1925. Serial No. 8,769.

This invention relates to certain improvements in electric toasting devices.

Among the objects of this invention is to provide a device of this character which may be cheaply manufactured and easily assembled and which may be operated by an unskilled person without danger of burning the fingers.

Another object is to provide an electrical heater element in a pair of co-ordinately movable slice holders, which may be moved from open to closed positions and vice versa, by a single spring-actuated and manually controlled device.

A further object is to provide a horizontally pivoted slice holder which can be quickly filled, moved to toasting position, and returned to the filling position; and when in the filling position, is held against accidental release.

With these and other objects in view, a preferred form of construction is described hereinafter and shown on the accompanying drawing, in which—

Fig. 2 is a transverse section showing the arrangement of the actuating member upon the end standard, with the parts in the open position, and Fig. 3 is a view corresponding to Fig. 2, with the slice holder in the closed position.

Figure 1:
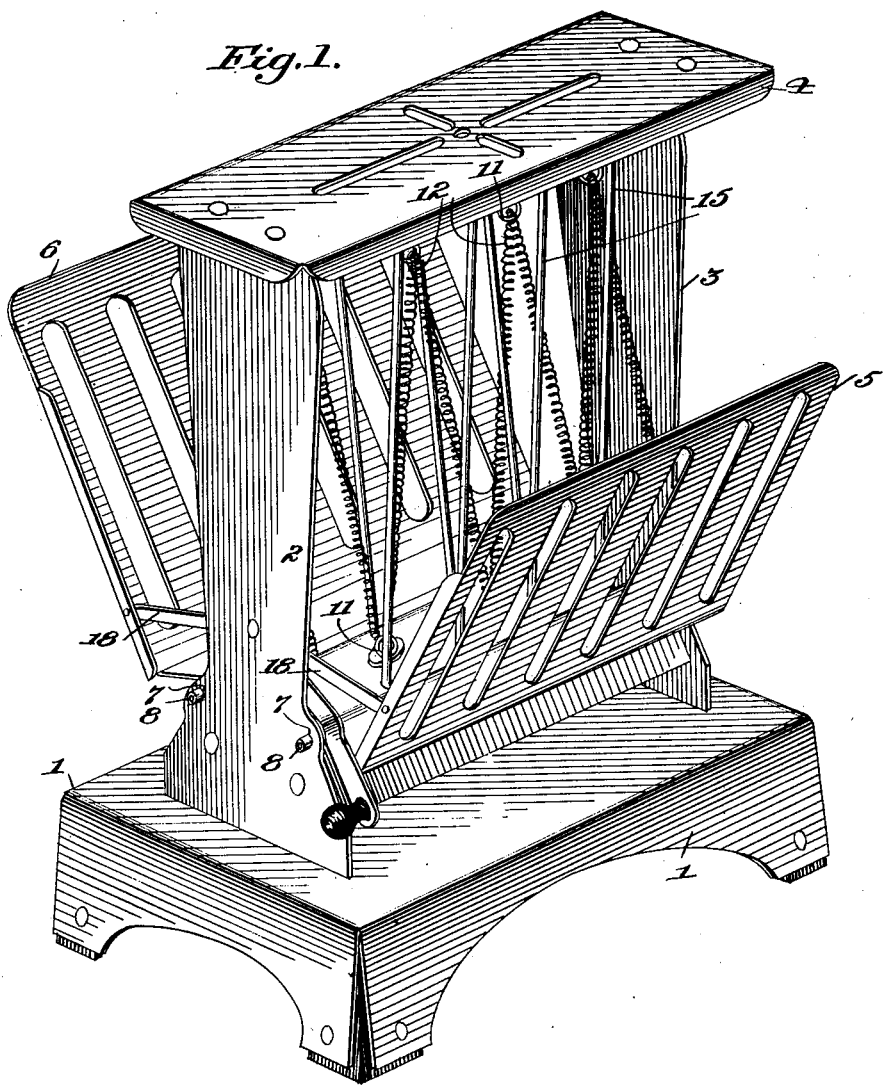
Figure 1 is a perspective view.

The toaster comprises a base 1 having standards or end pieces 2, 3 mounted thereon to support the top 4. In apertures 7 at suitable points of the standards 2, 3 are engaged the pivots 8 of a pair of slice holders 5, 6. These slice holders are preferably formed integral with the pivots 8 by appropriate punching and curling, and likewise have the integral end guides 9 for the slice of bread. The relative position of the slices of bread is shown at S, S' in Fig. 3, with the device in the closed position.

Within the standards 2, 3 is a top member 10ª and a bottom member 10 to receive the insulated stretcher rings 11 for the electric heater element 12, here shown as a single coil of resistance wire passed in zigzag form from one terminal to the other. It will be understood that appropriate current tap connections and conductors are provided to bring the current from the mains to this resistance wire. A series of guard wires 15 are passed through apertures of the bottom member 10 and top member 10ª and serve to prevent physical contact of the slice or other object with the redhot heater elements.

A spiral spring 16 is provided for each slice holder, and these springs are mounted upon the pivots 8, with the ends of each spring respectively engaged beneath the respective slice holder, and against the bottom member 10.

Pivoted to each slice holder by a pin 19 passing through a guide 9 is a link 18. These links are joined at their other ends by pivot pins 20 to the rotatable actuating member 21. This member 21 is pivotally mounted at 22 on the standard 2, and has a projecting arm 23 terminating in a handle or button 24. The downward movement of the arm 23 is limited by its impact upon one of the pivots 8, and its upward movement is limited by the impact of the slice holder and the bread thereon against the guard wires 15.

The method of utilizing the device is as follows: When the slice holders 5, 6 are in the open position, and the actuating member 21 and its arm 23 are in the position shown in Fig. 2, it will be noted that the pivot members 20, 20 in this position are slightly beyond the straight lines passing through the pivot 22 and the respective pivots 19; i. e., the assembly of the links 18, 18 and the member 21 form toggles to hold the slice holders 5, 6 in the open position. In this position, slices of bread are placed on the slice holders and the knob 24 is forced upward to rotate the actuating member 21 in a clockwise direction in Fig. 2, until the pivot points 20, 20 have moved beyond the straight lines between the pivot 22 and pivots 19, 19. The springs 16 now come into play to move the slice holders 5, 6 upwardly and inwardly, until the slice of bread is presented against the guard wires 15. This closed position varies somewhat by reason of difference in the thickness of the slice, but in every case, the slice is held tightly against the guards 15 under the pressure of springs 16.

When the slice is toasted on one side, the knob 24 and therewith the handle 23, are pushed downward, and the actuating member 21 rotated in a counter clockwise direction in Fig. 2. After the pivot points 20, 20 have passed the straight lines between the pivot 22 and the pivots 19, 19, the springs 16 tend to complete the rotation in the counter clockwise direction of the actuating member 21, until the arm 23 is engaged against the pivot 8 which forms a stop member therefor. The slice is now reversed, and the former operation repeated. A separate stop for the arm 23 may also be employed.

It will be understood that while the form shown is preferred, no limitation is intended thereby within the scope of the appended claims.

Having thus described the invention, what I claim as new and desire to secure by Letters Patent, is—

1. In a toaster having a vertical heater element, a pair of horizontally pivoted slice holders, resilient means to move said holders inwardly about their pivots toward the heater element, links connected to said holders, a rotatable actuating member, pivotal connections between said links and said member eccentric to the axis of said member so that said holders are moved simultaneously to open and closed position by rotation of said member, means to limit the movement of said member when said holders are being brought towards said heater element, and means to limit the movement of said member when said holders are being moved from said heater element.

2. A toaster having a heater element, a frame, a slice holder mounted on a horizontal axis on said frame, a rotatable actuating member pivoted about an axis on said frame, a link pivoted to said slice holder and to said member eccentric to the respective axes, a spring to force said holder into closed position, said spring in closing said holder rotating said member in one direction, a handle to rotate said member in the opposite direction to open said holder against the action of said spring, and a stop to limit the movement of said member in said opposite direction, the member and link forming a toggle so that when said member is held by said stop, the axes of the toggle are on one side of the extended position so that said spring cannot close said holder.

3. In a toaster having a frame and a heater element thereon, a pair of slice holders mounted on pivots in said frame and adapted to be moved between open and closed positions, a manually rotatable actuating member, connections between the said members and each of said holders to move the same coordinately, and a stop to limit the movement of said member in the direction of opening of the slice holders, said member, connections and holders cooperating when said member is in contact with said stop, to hold the holders against closing except upon manual actuation of said member.

4. In a toaster having a frame, a heater element mounted on said frame, a pair of slice holders mounted on pivots relative to said frame and adapted to be moved to open and closed positions, toggle links connected to said holders, an actuating member having the free ends of said toggle links pivoted thereto, and a spring to hold said actuating member and toggle links in either of their end positions.

5. In a toaster having a frame, a pair of slice holders pivotally mounted on said frame, an actuating member pivotally mounted on said frame, a pair of links pivoted to said holders respectively, and to said actuating member, a spring on each of said holders to urge said holder upwardly and inwardly, and a handle to rotate said actuating member.

6. In a toaster having a heater element, a frame, a pair of slice holders mounted on pivots in said frame, a rotatable actuating member mounted on said frame, a pair of links pivoted to said holder and to said member, said member presenting its pivot with one of said links above and below the plane passing through the axis of the member of the respective link in open and closed positions of the holder respectively and a spring to urge said slice holders inward about their pivots, said spring acting along one of said links against said member to hold said member in its end positions by the toggle effect produced by the presence of said mutual pivot respectively above and below the said plane.

7. In a toaster having a vertical heater element, a pair of horizontally pivoted slice holders, resilient means to move said holders inwardly about their pivots toward the heater elements, links connected to said holders, a rotatable actuating member, pivotal connections between said links and said member eccentric to the axis of said member, and means to limit the movement of said member when the latter has moved said pivot connections beyond the extended positions of the links in moving said holders away from the heater element.

In testimony whereof, I affix my signature.

MAURICE F. FITZGERALD.